United States Patent
Brandes et al.

(10) Patent No.: US 7,680,718 B2
(45) Date of Patent: Mar. 16, 2010

(54) SYSTEM AND METHOD FOR GENERATING REAL-TIME INDICATORS IN A TRADING LIST OR PORTFOLIO

(75) Inventors: Yossef Brandes, New York, NY (US); Ian Domowitz, New York, NY (US); Milan Borkovec, Boston, MA (US); Jian Yang, Sharon, MA (US); Robert D. Sinclair, Framingham, MA (US); Vitaly Serbin, Somerville, MA (US)

(73) Assignee: ITG Software Solutions, Inc., Culver City, CA (US)

( * ) Notice: Subject to any disclaimer, the term of this patent is extended or adjusted under 35 U.S.C. 154(b) by 487 days.

(21) Appl. No.: 11/476,895

(22) Filed: Jun. 29, 2006

(65) Prior Publication Data

US 2007/0143198 A1 Jun. 21, 2007

Related U.S. Application Data

(60) Provisional application No. 60/694,668, filed on Jun. 29, 2005.

(51) Int. Cl.
*G06Q 40/00* (2006.01)
(52) U.S. Cl. .................. 705/36 R; 705/37
(58) Field of Classification Search .......... 705/10, 705/35, 36, 37, 36 R; 364/408
See application file for complete search history.

(56) References Cited

U.S. PATENT DOCUMENTS

| 5,347,452 | A | * | 9/1994 | Bay, Jr. ................ 705/37 |
| 5,402,521 | A | | 3/1995 | Nida et al. |
| 5,761,386 | A | | 6/1998 | Lawrence et al. |
| 7,340,430 | B2 | * | 3/2008 | Mulinder et al. .......... 705/37 |
| 7,383,219 | B1 | * | 6/2008 | Jennings et al. ......... 705/36 R |
| 2002/0073018 | A1 | * | 6/2002 | Mulinder et al. .......... 705/37 |
| 2002/0169707 | A1 | * | 11/2002 | Koek et al. ............. 705/37 |
| 2002/0194110 | A1 | * | 12/2002 | Young ................... 705/37 |
| 2002/0194111 | A1 | * | 12/2002 | Young ................... 705/37 |
| 2003/0004853 | A1 | * | 1/2003 | Ram et al. .............. 705/37 |

(Continued)

FOREIGN PATENT DOCUMENTS

JP 2001155056 A 6/2001

(Continued)

OTHER PUBLICATIONS

Joseph A. Sabatini, Federal Reserve Bank of Boston. Implementing an AMA for Operational Risk: Perspectives on the "Use Test". JP Morgan Chase. May 20, 2005.*

(Continued)

*Primary Examiner*—Mary Cheung
*Assistant Examiner*—B. Joan Amelunxen
(74) *Attorney, Agent, or Firm*—Rothwell, Figg, Ernst & Manbeck (57) ABSTRACT

A system and method for detecting an abnormal trading condition of a security uses real-time and estimated values of one or more variables associated with the condition of the security to generate one or more analytic metrics that are compared to empirical distributions based on one or more peer groups for the security. An indicator can then be displayed to a trader as an indication of the abnormal condition.

26 Claims, 5 Drawing Sheets

U.S. PATENT DOCUMENTS

| | | | |
|---|---|---|---|
| 2003/0050879 A1 | 3/2003 | Rosen et al. | |
| 2003/0200169 A1* | 10/2003 | Freeny, Jr. | 705/37 |
| 2004/0064394 A1* | 4/2004 | Wallman | 705/36 |
| 2004/0148242 A1* | 7/2004 | Liu | 705/37 |
| 2004/0177024 A1* | 9/2004 | Bok et al. | 705/37 |
| 2004/0225567 A1 | 11/2004 | Mitchell et al. | |
| 2005/0091148 A1* | 4/2005 | Rotondo | 705/37 |
| 2005/0160021 A1* | 7/2005 | Nesmith et al. | 705/35 |
| 2006/0047563 A1* | 3/2006 | Wardell | 705/10 |
| 2006/0080211 A1* | 4/2006 | Anderson et al. | 705/37 |
| 2006/0080212 A1* | 4/2006 | Anderson et al. | 705/37 |
| 2007/0143198 A1* | 6/2007 | Brandes et al. | 705/36 R |

FOREIGN PATENT DOCUMENTS

| | | |
|---|---|---|
| JP | 2002169957 A | 6/2002 |

OTHER PUBLICATIONS

I. Schmerken, "Canadian Brokerage Hedges with On-Line Expertise", Wall Street Computer Review, v. 8, n. 3, pp. 66-69, Dec. 1990.

"Canadian Quantex User Manual, vol. I: Trade Execution, Release Version 1.1", RBC Dominion Securities Inc. and Investment Technology Group, Inc., Toronto, Canada, 1992.

"WOSA Extensions for Real-Time Market Data", Backgrounders and White Papers, Microsoft Development Library, Jan. 1994, pp. 1-8.

"Quantex Analytics", RBC Dominion Securities Inc. and Investment Technology Group, Inc., Toronto, Canada, May 7, 1993, pp. 1-26.

Supplementary European Search Report issued in EP application No. 06774277.5 on Aug. 20, 2009, 7 pages with XP002456252.

* cited by examiner

SYSTEM AND METHOD FOR GENERATING REAL-TIME INDICATORS IN A TRADING LIST OR PORTFOLIO

This application claims the benefit of U.S. Provisional Application Ser. No. 60/694,668 filed Jun. 29, 2005, the contents of which are incorporated herein by reference.

BACKGROUND OF THE INVENTION

1. Field of the Invention

The present invention relates to investment portfolio management systems. In particular, the present application relates to a computerized investment portfolio management system and method for recognizing abnormal conditions in real-time, for a security being traded in a trading forum.

2. Description of the Related Art

Computerized trading systems exist that allow traders to monitor and execute transactions in trading forums, such as the NASDAQ. Some trading systems include portfolio management functions and/or allow traders to execute trade lists. For example, U.S. Published Patent Application No. 2004/0181479, is directed to an investment portfolio optimization system, method and computer program product, the entire contents of which are incorporated herein by reference.

When trading a portfolio or a trade list, a small number of securities can sometimes skew the performance of the entire portfolio. It would be important to traders trading portfolios and trade lists to be able to identify, preferably in real-time, such securities that could hurt the performance of a portfolio or trade list, so that the trader can take the appropriate actions to minimize potential losses to the portfolio or trade list.

While computerized trading systems exist that allow traders to view real-time market data, such as price, volume and spread, and certain analytics or quantitative metrics, such as moving averages, these systems fail to identify and effectively communicate to the trader abnormal conditions as they occur in real-time. Thus, there remains a need for a system that can recognize abnormal conditions in real-time and provide indicators that allow the trader to react quickly to the abnormal conditions.

SUMMARY OF THE INVENTION

It is therefore an object of the present invention to overcome disadvantages of the prior art by providing systems and methods capable of identifying an abnormal condition of a security traded on an exchange.

A first aspect of the present invention is a system for generating an indicator of abnormality in the condition of a security traded on an exchange using real-time data from a remote source. The system includes a computer with a processor and a memory device storing a set of machine readable instructions executable by the processor to receive in real-time from the remote source a real-time value of a first variable related to a condition of the security, retrieve historical market data for the security, and retrieve an empirical distribution of analytic or quantitative metrics for a peer group of the security, wherein the empirical distribution is based on a relationship of empirical values of the first variable for members of the peer group. The system then estimates the value of the first variable based on the historical market data for the security, calculates an analytic metric (also referred to herein as an "analytic result") based on a relationship between the value received in real-time and the value obtained by estimating, and compares the analytic metric for the security with the empirical distribution of analytic metrics for the peer group to determine whether the condition of the security is abnormal.

In a preferred embodiment, the system receives in real-time from a remote source real-time values of a plurality of variables related to a condition of the security. Examples of the types of variables that may be monitored in real-time by the system include, but are not limited to, trade price, trading volume, bid-ask spread, and depth. Both real-time values of the variables as well as estimates thereof based on historical data can be dynamically updated throughout the trading day. Examples of the types of analytics that can be calculated using the real-time values of the variables and estimates thereof include, but are not limited to, relative volatility, relative volume, and relative cost. The peer group used to generate empirical distributions preferably includes a plurality of securities having similar characteristics to the first security (e.g., volume, volatility, price, etc.). The system determines whether or not an abnormal condition exists based on a comparison of the analytic metrics to the empirical distribution of peer group analytics. For example, if the analytic metric is an unlikely deviation from the empirical distribution, an abnormal condition may be deemed to exist. In one embodiment, the system can display an indicator to a trader alerting the trader of the abnormal condition. The indicators can reflect the degree and kind of condition. The system can include a single computer that performs all of the above functions, or a network of computers wherein, e.g., certain functions are performed by a server and other functions are performed by user workstations connected with the server.

Another aspect of the present invention is a method of detecting an abnormal condition of a security traded on an exchange. The method includes the steps of receiving in real-time a value of a first variable related to a condition of the security, estimating the value of the first variable based on historical market data for the security, calculating an analytic metric based on a relationship between the value obtained by real-time monitoring and the value obtained by estimating, retrieving an empirical distribution of analytic metrics for a peer group of the security, and comparing the analytic metric for the security based on real-time data with the empirical distribution of analytic metrics for the peer group to determine whether the condition of the security is abnormal.

In a preferred embodiment, the method includes the steps of receiving in real-time from a remote source real-time values of a plurality of variables related to a condition of the security. Examples of the types of variables that may be received in real-time according to the method include, but are not limited to, trade price, trading volume, bid-ask spread, and depth. Both real-time values of the variables as well as estimates thereof based on historical data can be received continuously (i.e., dynamically) throughout the trading day. Examples of the types of analytics that can be calculated using the real-time values of the variables and estimates thereof include, but are not limited to, relative volatility, relative volume, and relative cost. The peer group used to generate empirical distributions preferably includes a plurality of securities having similar characteristics to the first security (e.g., volume, volatility, price, etc.). In determining whether or not an abnormal condition exists based on a comparison of the analytic relation to the generated empirical distribution, the method may, for example, deem an abnormal condition to exist if the analytic relation is an unlikely deviation from the empirical distribution. In one embodiment, the method also includes the step of displaying an indicator to a trader alerting the trader of the abnormal condition. The indicators can reflect the degree and kind of condition.

Yet another aspect of the present invention is a computer program product for generating an indicator of abnormality in the condition of a security traded on an exchange. The computer program product includes a digital storage media and a set of machine readable instructions, stored on the digital storage media, which are executable by a computer to establish communication between the computer and a remote source, receive a value of a first variable related to a condition of the security in real-time from the remote source, retrieve historical market data for the security and estimate the value of the first variable based on the historical market data for the security, calculate an analytic metric based on a relationship between the real-time value of the first variable and the estimated value of the first variable, retrieve an empirical distribution of analytic metrics for a peer group of the security, and compare the analytic metrics for the security with the empirical distribution of analytic metrics for the peer group to determine whether the condition of the security is abnormal.

In a preferred embodiment, the computer program product is configured such that, when it is executed, it causes a computer to receive in real-time from a remote source real-time values of a plurality of variables related to a condition of the security. Examples of the types of variables that may be received in real-time include, but are not limited to, trade price, trading volume, bid-ask spread, and depth. Real-time values of the variables as well as estimates thereof based on historical data can be received continuously (i.e., dynamically) throughout the trading day. Examples of the types of analytics that can be calculated using the real-time values of the variables and estimates thereof include, but are not limited to, relative volatility, relative volume, and relative cost. The peer group used to generate empirical distributions preferably includes a plurality of securities having similar characteristics to the first security (e.g., volume, volatility, price, etc.). The computer program product can be configured to determine whether or not an abnormal condition exists based on a comparison of the analytic relation to the generated empirical distribution. For example, if the analytic relation is an unlikely deviation from the empirical distribution, an abnormal condition may be deemed to exist. In one embodiment, the computer program product can include instructions executable by the computer to display an indicator to a trader alerting the trader of the abnormal condition. The indicators can reflect the degree and kind of condition. In another embodiment, the computer program product includes a second set of instructions executable by a second computer to receive indicators from the first computer and display them on the second computer.

Further objects and advantages of the present invention are discussed below with reference to the drawing figures.

BRIEF DESCRIPTION OF THE DRAWINGS

FIG. 5 is a screen shot of a trading desktop showing certain indicators shaded according to another embodiment of the present invention.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and such examples are not intended to limit the invention to the embodiments shown or described herein.

Figure 1:
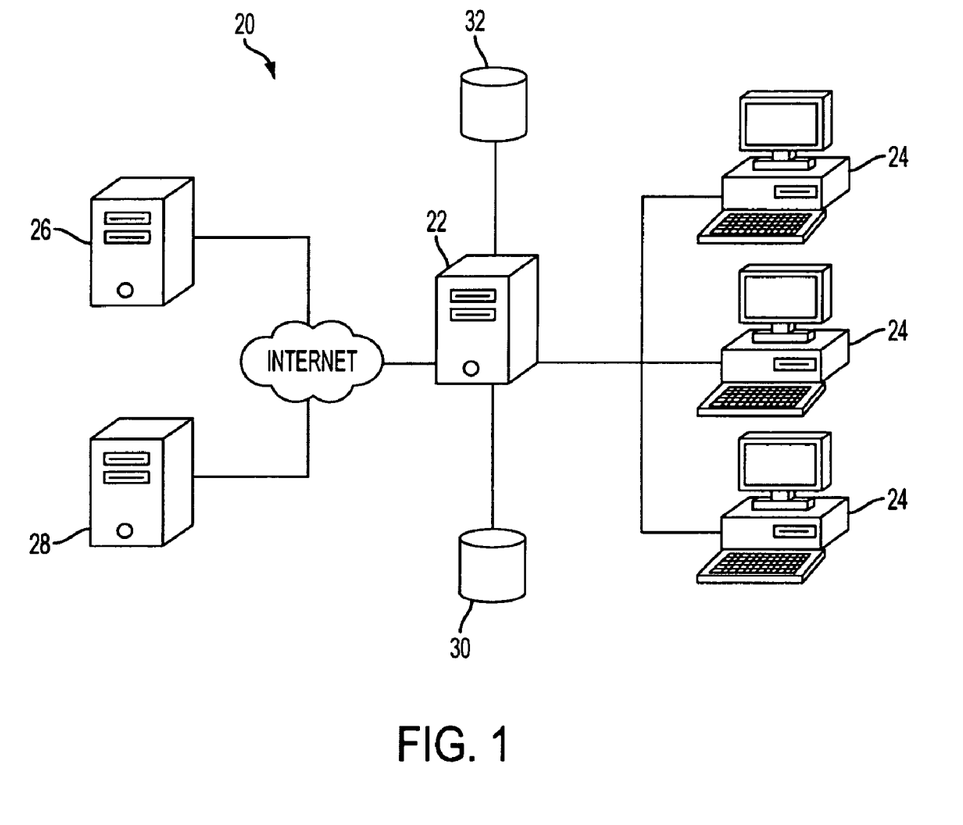
FIG. 1 is a schematic diagram of a system for identifying securities having abnormal conditions according to an embodiment of the present invention.

Referring now to FIG. 1, a schematic diagram of a system 20 for identifying abnormal conditions in a list of one or more securities according to an embodiment of the present invention is shown. The system 20 includes a server 22 in communication with one or more user workstations 24, for example via a direct data link connection or a network such as a local area network (LAN), an intranet, or the Internet. The server 22 and the work stations 24 can be computers of any type so long as they are capable of performing their respective functions as described herein. The computers can be the same, or different from one another, but preferably each have at least one processor and at least one memory device capable of storing a set of machine readable instructions (i.e., computer software) executable by at least one processor to perform the desired functions, where by "memory device" is meant any type of media or device for storing information in a digital format on a permanent or temporary basis such as, for example, a magnetic hard disk, flash memory, an optical disk, random access memory (RAM), etc.

The computer software stored on the server ("server software"), when executed by the server's processor, causes the server 22 to communicate with the workstations 24 and one or more remote sources 26 of financial data, such as data vendors, that offer real-time securities data in an electronic format. The server software, when executed by the server's processor, also causes the server 22 to perform certain calculations, described in greater detail below, using the real-time data from the data vendors 26, as well as historical data about the securities and peer group data, to determine whether an abnormal condition exists, and to send an indicator of the condition to one or more workstations 24.

The computer software stored on a workstation ("user software"), when executed by the workstation processor, causes the workstation 24 to receive indicators from the server 22 and to display the indicators to a user on a monitor, for example using a spreadsheet program, such as Microsoft® EXCEL®, an automated portfolio optimization program, such as ACE®, or any other type of computer program capable of displaying a list of securities and data associated with the listed securities.

Historical securities data used by the system 20 to identify abnormal conditions can be received from a remote source 20, such as a data vendor, or from a local database 30 connected to, or maintained on, the server 22. Empirical peer group data is preferably stored in a database 32 maintained on, or otherwise accessible by the server 22.

The server 22 can be located at the user's facility or at a site remote from the user's facility. Communication between the server 22 and the data vendors 26 and 28 can be accomplished via a direct data link connection or a network, such as a LAN, an intranet or the Internet. In alternate embodiments, one or more workstations can be configured to perform the server functions such that a dedicated server is not needed. It will also be appreciated that workstations can be configured to communicate individually with data vendors and/or local databases without being networked to a server or other workstations.

Operation of the system 20 is described with reference to the flow chart shown in FIG. 2, which illustrates a method 40 of identifying abnormal conditions in a list of one or more securities according to an embodiment of the present invention. The method begins at step 42, at which time the system initiates a number of steps involving receipt of certain information that will be used to determine abnormal conditions of securities. At step 44, the system receives from a remote source, such as a data vendor, real-time values of one or more variables associated with a first condition of a security traded on an exchange, and stores at least some of the values in memory. Examples of the types of variables that may be received in real-time from remote sources include, but are not limited to, trade price, trading volume, bid-ask spread, and depth (i.e., ask size for buy orders or bid size for sell orders). In a preferred embodiment, values are received continuously in real-time throughout a trading day and some of these values (e.g., values received at predetermined intervals) are used to calculate certain analytics as described in greater detail below. In a presently preferred embodiment, values received at a predetermined interval of about five seconds are used to compute the analytics. In addition, at least some of the real-time values may optionally be stored in a database on the server or elsewhere for later reference as historical data.

At step 46, the system receives historical data on prior values of the first variable and stores the historical data in memory. For example, the historical data may include an average value of the first variable for a particular time of day. In a preferred embodiment, the historical data includes a running average of values over a 21 day period. The historical data can be received from one or more remote or local sources whenever it is needed, but is preferably received at predetermined intervals throughout the day (e.g., about every five seconds). In a preferred embodiment, at least some of the historical data is maintained in a database on the server and updated daily. At the beginning of the trading day, the historical data in the database can be uploaded into memory so that it can be accessed immediately by the system at any time during the trading day. Alternatively, all or some of the historical data may be received from a remote source, such as a data vendor.

At step 48, the system receives peer group data including values of the first variable for a group of securities that are considered to be within a peer group of which the first security is a member. Alternatively, the peer group data includes empirical distributions of analytic metrics based on historical values of the first variable for the peer groups. Preferably, the peer group includes a plurality of securities having similar characteristics to the first security. For example, characteristics such as industry or sector (e.g. basic materials, consumer cyclical, consumer non-cyclical, financials, health, industrials, information technology, resources, telecommunication services, and utilities), exchange (e.g., New York Stock Exchange, American Stock Exchange, and NASDAQ), and capitalization (e.g., large or small cap) can be used to define dozens of peer groups.

The peer group data can be received from one or more remote or local sources whenever it is needed. In a preferred embodiment, at least some of the peer group data is maintained in a database on the server and updated at least quarterly. Like the historical data, at the beginning of the trading day, the peer group data in the database can be uploaded into server memory so that it can be accessed immediately by the system at any time during the trading day. Alternatively, all or some of the peer group data may be received from a remote source, such as a data vendor. The peer group data may be accessed as frequently as desired but is preferably accessed at predetermined intervals throughout the day (e.g., about every five seconds).

Figure 2:
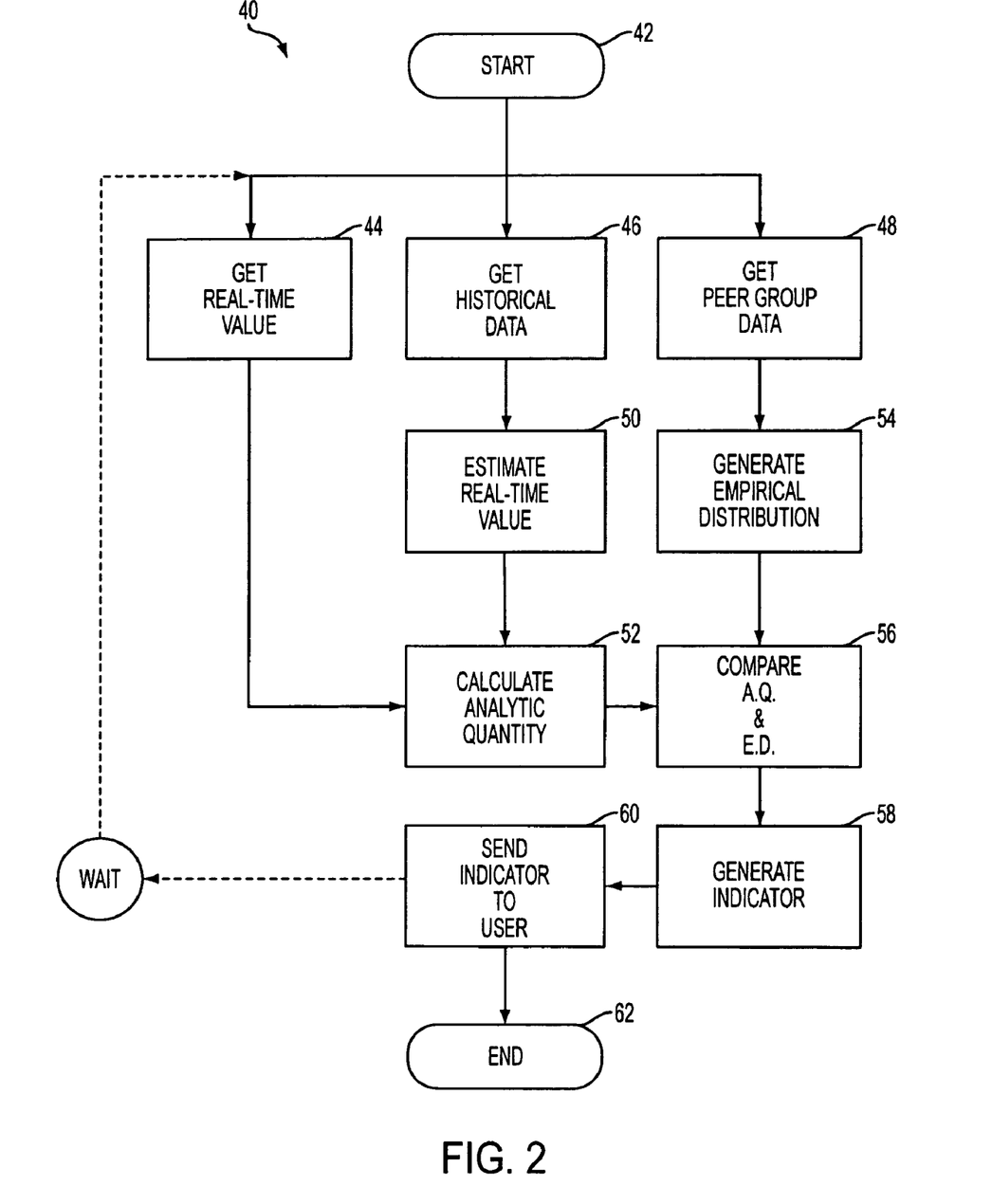
FIG. 2 is a flow chart of a method for identifying securities having abnormal conditions according to an embodiment of the present invention.

While steps 44, 46 and 48 are shown in FIG. 2 as being performed in parallel, it will be appreciated that two or more of these steps can be performed serially in any order. In a preferred embodiment, steps 44, 46 and 48 are performed at predetermined intervals (e.g., about every five seconds) throughout a trading day.

At step 50, the system estimates a value for the first variable based on the historical data received in step 46. For example, if a real-time value of the first variable is received at a particular time during a trading day and the historical data includes several values for the variable at the same time of the day (e.g., within five minutes of the time), the system might use an average value of the first variable for the same time period as the estimated value for the first variable.

At step 52, the system calculates an analytic metric or result using the real-time value of the first variable obtained in step 44 and the estimated value of the first variable generated in step 50. Some examples of the types of analytic metrics ("analytics") that can be calculated include, but are not limited to, relative volatility, relative volume, and relative price, each of which is described in greater detail below. In general, the analytics involve some type of ratio or relationship between the real-time and estimated values of the variable, providing an indication of how much the real-time value deviates from historical values of the variable.

At step 54, the system determines analytic metrics for each of the securities in the peer group using the data obtained in step 48. In one embodiment, the peer group database includes historical values of the variable for the peer group and the system uses the values to generate an empirical distribution of analytic metrics for the peer group. Alternatively, the database may include empirical distributions of analytic metrics organized by peer group and the system may receive an empirical distribution for an appropriate peer group in step 48 such that it is not necessary to generate an empirical distribution from raw data each time the method is practiced.

At step 56, the system compares the analytic metric determined at step 52 with the empirical distribution of analytic metrics determined at 54. For example, the system might determine where the analytic metric falls within the distribution in terms of percentile or standard deviation.

At step 58, the system uses the result of the comparison at step 56 to generate an indicator of abnormality for the security. The indicator can be qualitative (i.e., abnormal condition exists or does not exist) or it can be more quantitative (e.g., degree of abnormality in a positive or a negative sense, etc.). For example, a qualitative determination may be made that a quantity more than two standard deviations from the mean of the empirical distribution is abnormal. Alternatively, abnormality can be measured on a scale (e.g., −5 to 5), with an indicator value of 0 reflecting a neutral, average or normal condition.

The indicator of abnormality generated in step 58 is then sent to a user at step 60 for display by the user workstation. The process 40 is shown ending at step 62, but it will be appreciated that the process can be repeated periodically throughout the trading day, e.g., every few seconds or whenever the system receives a request for an update.

As described in greater detail below, the indicator is preferably displayed to the user in a spreadsheet format in which a list of securities and associated information are arranged in rows and columns. Any icon or visual symbol can be employed as an indicator of abnormal conditions. For example, a plurality of up or down arrows could be used to indicate whether the current trading condition is in an upper or lower percentile of the empirical distribution for the peer group, the number of arrows displayed reflecting the degree of abnormality. Boxes, bullets and/or bars can be used with or without a divider line indicating the average or mean value of the empirical distribution. Charts, colors, shading and/or other visual aids can also be employed.

The present invention may be used in conjunction with or as an extension to a trading platform. An exemplary trading platform with which the present invention can be used is described in co-owned U.S. patent application Ser. No. 10/166,719, filed on Jun. 12, 2002, the entire contents of which are hereby incorporated by reference. That application describes an Agency Cost Estimator ("ACE") method and system that allow a user to obtain price impact cost estimates for any pre-specified strategy, and generates an optimal trading strategy subject to certain assumptions. ACE further allows a user to submit a proposed portfolio trade execution and analyzes the execution according to a trading strategy algorithm. The present invention may act in cooperation with or as an extension to platforms like ACE by identifying, preferably in real-time, securities that could hurt the performance of a portfolio or trade list, so that the trader can take the appropriate actions to minimize potential losses to the portfolio or trade list.

Figure 3:
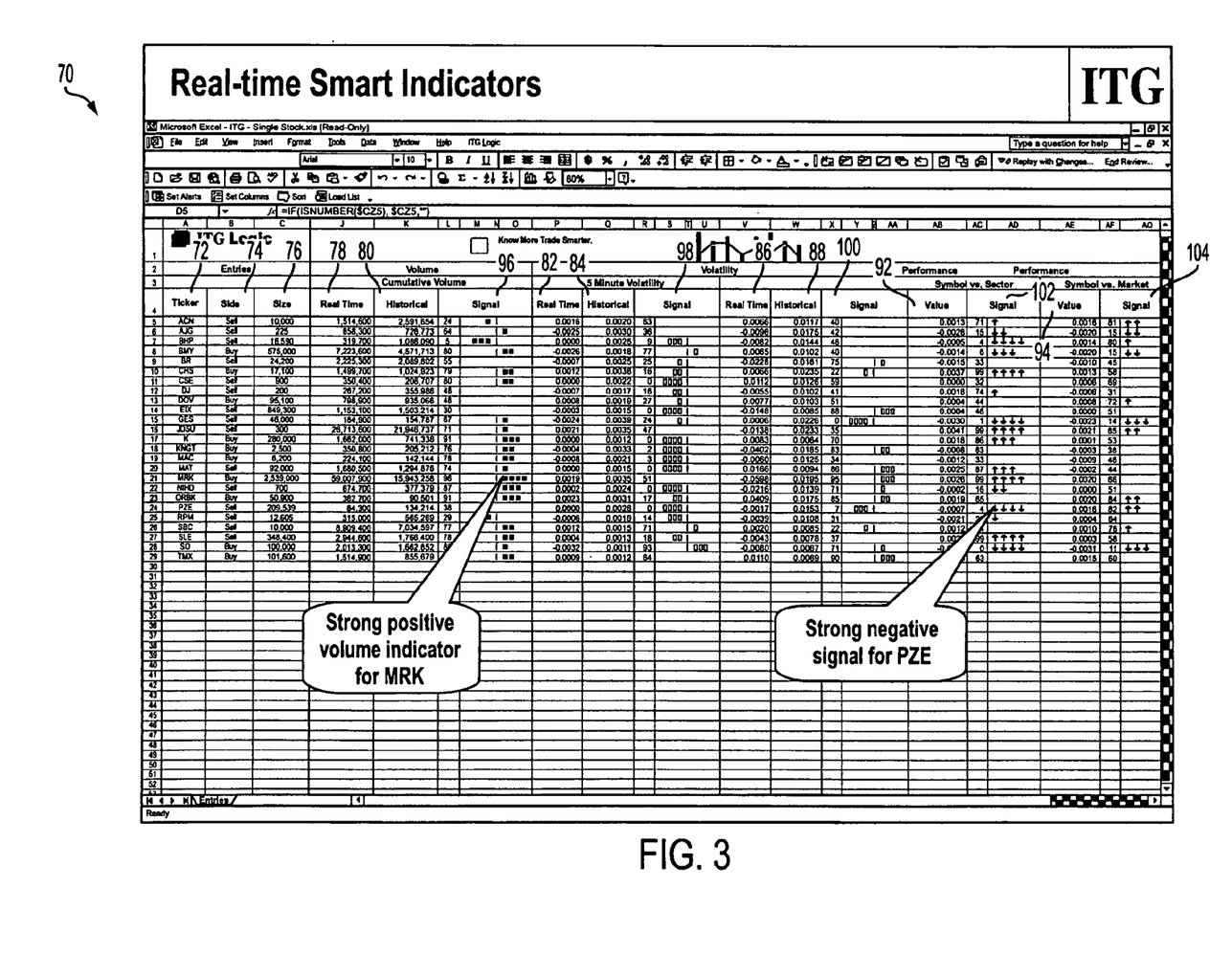
FIG. 3 is a screen shot of a trading desktop displaying indicators for a list of securities according to an embodiment of the present invention.

An exemplary screen shot 70 of a screen from a trading platform or desktop employing indicators of abnormality according to an embodiment of the present invention is shown in FIG. 3. In this example, streaming data is used to populate a MICROSOFT® EXCEL® spreadsheet. As shown, the spreadsheet includes rows listing the securities in a trade list or portfolio and columns displaying ticker symbol 72, side 74 (i.e., buy or sell), size of the order 76, real-time and historical volume 78 and 80, real-time and historical 5-minute volatility 82 and 84, real-time and historical cumulative volatility 86 and 88, and performance 90 (i.e., symbol v. sector 92 and symbol v. market 94). As shown in this example, indicators can be displayed on the spreadsheet to show abnormal trading conditions of the listed securities. In particular, the spreadsheet includes columns displaying indicators determined in accordance with the present invention, specifically volume indicators 96, 5-minute volatility indicators 98, cumulative volatility indicators 100, symbol v. sector performance indicators 102, and symbol v. market performance indicators 104. In this example, it was determined that security MRK currently has an abnormally high volume, while PZE currently is performing poorly versus the sector.

In particular, the real-time volume for MRK at the time the screen shot was taken was 59,007,900 as compared to the historical cumulative volume (e.g., over the last 21-days) which was only 15,943,258. The ratio of current to historical volume was therefore, 3.7. When this ratio is compared to the empirical distribution for the peer group, it falls in the 96% of the distribution spectrum; that is, it is only 4% likely that the real-time cumulative volume of 59 million would occur, and therefore, the volume indicator is set to level 4 to indicate a severe abnormality. The trader can consider and react appropriately to this important information. Thus, it is easy to understand how useful indicators generated according to the present invention can be to a trader.

As mentioned previously, any icon or visual indicator can be employed to signify abnormal conditions. For example, a plurality of up or down arrows could be used to indicate whether the current condition is in an upper or lower percentile of the distribution of metrics. Boxes, bars or bullet points could be used with or without a divider line indicating the average or mean value of the empirical distribution. Charts, colors, shading or other visual aids can also be employed.

Indicators generated in accordance with the present invention could be further used to alert or warn the user/trader of dangerous conditions. For example—changes in volume patterns may require changing participation rates in a portfolio, or when a certain symbol is outperforming a corresponding sector index it might be necessary to execute a "short" based on the belief that it will return to historical levels.

Figure 4:
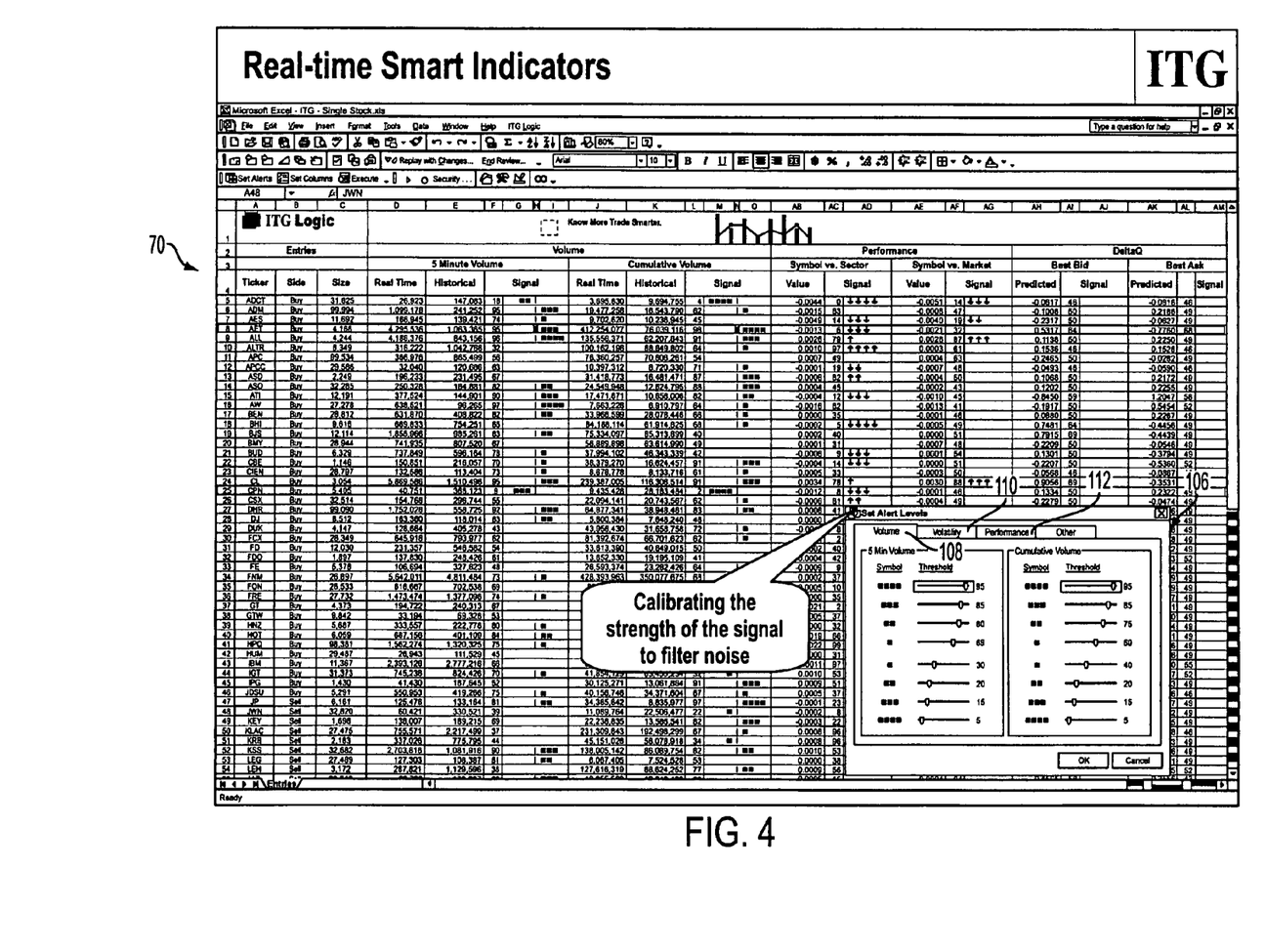
FIG. 4 is a screen shot of a trading desktop showing a window that allows a user to set alert levels according to an embodiment of the present invention.

Referring to FIG. 4, the system can be configured to allow the user to assign alert level set points used to trigger such an alarm or to configure the indicators display characteristics (e.g., at what range the indicators change display levels—such as from 3 to 4 "dots" or "bars"). As shown, a pop-up box or window 106 is displayed over the spreadsheet 70 and includes tabs for volume 108, volatility 110, performance 112, etc. Ranges can be set based upon the empirical distribution spectrum (in percent), but in the case of normal distributions, could be set by standard deviation. Note that the entire line for symbol CPN is highlighted and corresponds to the pop-up box 106. Levels can be set for each individual indicator or globally for all indicators.

It should be understood that market data can be used to generate indicators according to the present invention. Preferably, LEVEL 1 and/or LEVEL 2 data is collected in real-time for input into a system performing the analytics to generate the indicators.

Real-time and historical market data can be collected for each security in a portfolio or trade list, or for all securities. Accordingly, a system implementing indicators according to the present invention should be configured to receive such information and preferably will include a "live feed" or "stream" of data. Empirical distributions may be generated by any means and should be accessible to the system. Alternatively, a means for generating empirical distributions locally could be included, which could generate such distributions dynamically based on up-to-date historical data.

The peer groups can be defined statically (i.e., predetermined) on the basis of characteristics such as, e.g., sector, exchange, and capitalization, or dynamically, by identifying securities having similar characteristics to a selected security such as, e.g., volume, volatility, price, etc.

FIG. 5 is a screen shot of another embodiment of the present invention wherein data is shaded or color coded on the trading desktop to indicate abnormal trading conditions for a security. For example, in row 17 of the spreadsheet, the symbol ATI is shown to have abnormally high volatility by color coding cells 116a and 116b; and in row 21, the symbol LU is shown to have abnormally high volume by color coding cells 118a and 118b. The decision whether or not to shade or color code a cell to indicate an abnormal condition is preferably based on a comparison of the type described above in connection with method step 56 in FIG. 2.

No particular system configuration must be used to implement the present invention. It is recognized that it may be easiest to use a web based or client-server architecture wherein analytics are programmed onto a central server or onto a plurality of servers. Analytics can also be calculated on the client side as well.

Real-time and historical data is typically obtained from data vendors, via, for example, a dedicated line or over an electronic data network. Level 1 and/or level 2 data can be used. Examples of level 1 data include, but are not limited to, FITCH, ISSM, TAQ, TORQ or so-called "ticker" information. Level 2 data offers the unique ability to observe the amount of market liquidity, the price structure, and the quantity of unexecuted displayed limit orders at any given time of the day for any market venue. It contains trade as well as all order information (order messages about additions, modifications and cancellations) and thus particularly, all quote information beyond the best levels. Real-time analytics are preferably input into a real-time data and analytics API. Qualitative signals are derived from the historical and real-time data and output to the client, which in this case is an EXCEL or order management system ("OMS") client. The client interface is preferably robust and flexible enough to enable the users to create their own custom analytics.

Analytics

One skilled in the art will understand that the analytics used to generate indicators according to the present invention can vary. As described above, historical and real-time data may be collected from a number of sources for the calculation of analytics generating stock signals such as Relative Volume, Relative Volatility, etc. Indicators could be generated according to the present invention for any stock signal that is displayed on a trading desktop.

Empirical distributions can be generated a number of ways for a number of periods. Quarterly distributions are contemplated for simplicity. Of course, longer or shorter periods could be used for generating distributions. Historical data can be used to generate empirical distributions for predetermined (i.e., static) or dynamically determined peer groups. Preferably, peer groups are created for use with all analytics, however, one will understand that different peer groups could be used for different analytics.

A number of exemplary analytics are described below which can be implemented according to the present invention. The below discussion of analytics is by no means intended to limit the present invention to only those analytics described and one having ordinary skill in the art will readily understand that other analytics could be used to generate abnormal condition indicators according to the present invention.

Relative Volatility $$\text{Relative Risk} = \frac{|r_\tau|}{\sigma_\tau},$$

where $r_\tau$ is
(a) today's return over time $\tau - \Delta\tau$ through $\tau$, and
(b) today's return from "open" to $\tau$; and
$\sigma_\tau$ is the historical volatility of the same time period in a day.

For meaningful analytics, the time interval $\Delta\tau$ in (a) above should be appropriately set; for example, 5-minute intervals could be chosen. The historical average statistics can be computed based on the analytics which provide 30-minute bin volatility distributions. The historical average statistics are preferable dynamic or "moving" averages. Historical estimates may be updated periodically or on a monthly basis.

Relative volatility or risk can be based on the following data for each stock:

60 most recent prior day's closing prices, daily (forward-looking) relative volatility, and intra-day mid-quote volatility The intra-day mid-quote volatility is given by:

$$\sqrt{\frac{1}{n-1} \sum_{i=2}^{n} \frac{(\ln(P_i/P_{i-1}))^2}{t_i - t_{i-1}}},$$

where
n is the total number of valid quotes for that day;
$P_i$ and $t_i$ are, respectively, a midpoint and time (in seconds) of the i'th valid quote. If the first quote was before regular opening time, we set $t_1$ to the regular opening time.
Valid quotes are defined as quotes with no or valid condition codes that
(a) have strictly positive bid and ask prices.
(b) have strictly larger ask than bid prices (crossed or locked quotes should be excluded).
(c) have strictly positive bid and ask sizes for specified markets.
(d) are not second level quotes (a second level quote is defined as a quote that has a market maker i.d.).
(e) have time stamps within regular trading hours or, for USA only, represents the last quote prior to regular opening time reported from the primary market for the stock.

Stock-specific and aggregated binned volatility "distributions" ($\zeta_j$), j=0,1, ..., 13, can be retrieved or derived. The value $\zeta_o$ represents the weight for the overnight volatility. Note that the sum of the weights of ($\zeta_j$) does not equal to one, however the sum of the weights for ($\zeta_j^2$) does. Certain stocks do not trade at a volume sufficient such that meaningful statistics can be generated from the data relating solely to that stock. Therefore, stocks that do not have specific volatility numbers are aggregated by "liquidity bands". Volatility is, then, calculated for this group. For example, all stocks that trade between 5 M-10 M shares a day become one group, etc.

In addition, the historical daily volatility of a stock should be computed. The daily volatility $\sigma$ with capped maximum return value can be computed based on the split-adjusted daily returns of the last 60 trading days and is defined as:

$$\sigma = \left( \frac{1}{(|T|)-1} \sum_{t \in T} (r_t - \bar{r})^2 \right)^{1/2}$$

where $r_t = (q_t - q_{t-1})/q_{t-1}$, $\bar{r} = 1/|T| \cdot \Sigma_{t \in T} r_t$, $T = \{t=1, \ldots, 60 | r_t \text{ exists}\}$ and $|T|$ is the cardinal number of set T.

The term "with capped maximum return value" means that the largest return in absolute value is capped to the second largest return in absolute value, then adjust by sign. That is, if the largest return in absolute value is −0.3 and the second largest in absolute value is 0.2, then the largest value will be replaced with −0.2. In the case that less than 10 return observations (i.e. if $|T|<10$) exist, the forward-looking volatility can be used.

The real-time data for the relative volatility measure (a), includes the last trade price $P_\tau$ within the last 5 minutes and the last trade price $P_{\tau-\Delta\tau}$ before $P_\tau$. In the case that there are no trades in the last 5 minutes or if $P_{\tau-\Delta\tau}$ does not exist or was reported more than 30 minutes prior to $P_\tau$, the return is set equal to 0; for the relative volatility measure (b), data includes the last trade price $P_\tau$ and today's open price $P_{open}$. In the case that there are no trades, the return is set equal to 0.

Intraday return can be represented by $r_t=(P_\tau-P_{\tau-\Delta\tau})/P_{\tau-\Delta\tau}$. Return from open to $\tau$ can be represented by $r_t=(P_\tau-P_{open})/P_{open}$.

For Historical volatility within one regular bin i (for relative volatility measure (a)), the bin volatility is defined as $\sigma_i=\zeta_i\sigma$. The 5-minute volatility is set to be equal to $\sigma_\tau=(\Delta\tau/30)^{1/2}\sigma_i$.

For Historical volatility across two regular bins i and j (for relative volatility measure (a)), if the interval $\tau-\Delta\tau$ through $\tau$ crosses two regular bins as $\Delta\tau=\Delta_i+\Delta_j$ then the 5-minute volatility becomes $$\sigma_\tau = \left(\frac{\Delta i}{30}\sigma_i^2 + \frac{\Delta i}{30}\sigma_j^2\right)^{1/2}.$$

For Historical volatility at the open (for relative volatility measure (a)), if $\tau$ is between 9:30 am and 9:35 am, $r_\tau$ is defined as the return over time from open to $\tau$ and $$\sigma_\tau = \left(\frac{\Delta}{30}\sigma_1^2\right)^{1/2},$$

where $\Delta$ is the number of minutes from 9:30 to $\tau$.

For Historical volatility from open to $\tau$ (for relative volatility measure (b)), if $\tau \in$ bin I and $\Delta\tau$ is the time from the beginning of the bin i to $\tau$, the historical volatility from open to $\tau$ is defined as $$\sigma_\tau = \left(\sum_{j=1}^{i-1}\sigma_j^2 + \frac{\Delta\tau}{30}\sigma_i^2\right)^{1/2}.$$

For the mapping of quantitative statistics into qualitative signals, "cutoffs" can be group-specific, where the groups are classified by sector (ITG Industry Classification based on FTSE), market, and addv. Cut-offs are parameters used to define peer groups—stocks that are grouped together for specific indicators. For example, all stocks that are in the information technology sector and traded on NYSE and have an Average Daily Dollar Volume (ADDV) bigger than X can be grouped together.

Relative Volume $$\text{Relative volume} = \frac{Vol_\tau}{V_\tau},$$

where $Vol_\tau$ is today's actual trading volume from open to $\tau$, today's actual trading volume in the period $(\tau-5\min,\tau)$ and $V\tau$ is the historical average volume of the same time period within a day.

Relative volume is analogous to relative volatility. Relative volume can be calculated with the following data for each stock: prior day's closing price q, 21-days median dollar volume (addv) DV. Analogously to ACE, the 21-day median share volume can be defined as $V=DV/q$.

Stock-specified and aggregated 30-minute (bin) volume distribution ($\Psi_j$) can be retrieved or derived.

The real-time data includes the trade sizes of all semi-valid trades from open to $\tau$ (from $\tau-5\min$ to $\tau$) or, alternatively, the cumulative (semi-valid) trading volume from open to $\tau$ (from open to $\tau$) on a minute (or a few seconds) basis.

Assume that $\tau$ is in bin I and $\Delta\tau$ minutes after the end of bin i−1. We define the historical cumulative trading volume from open to $\tau$ as $$V_\tau = \left(\sum_{k=1}^{i-1}\psi_k + \frac{\Delta\tau}{30}\psi_i\right) \cdot V,$$

from $\tau-5$ min to $\tau$ as $$V_\tau = \begin{cases} \frac{5}{30}*\psi_i*V, \Delta\tau) 5 \text{ min} \\ (\Delta\tau_1\psi_{i-1}+\Delta\tau_1\psi_i)\frac{V}{30}, \text{otherwise,} \end{cases}$$

where $\Delta\tau_1$ and $\Delta\tau_2$ is the tem spent in bin i−1 and i, respectively. In particular, $\Delta\tau_1+\Delta_2=5$ min.

Note that empirical distributions of relatively illiquid stocks may have a substantial weight close to zero (especially for 5-minute relative volume distribution).

Relative Cost $$\text{Relative cost} = \frac{PI_\tau}{ACE\tau},$$

where $PI_\tau$ is the price impact estimate at time $\tau$ for a particular order size and $ACE_\tau$ is the ACE estimate for executing the same order size in the bin corresponding to time$_\tau$.

Price Impact Model

Price impact estimates for a particular time and order size can be derived from the formula: Price Impact=Spread Component+Liquid Demand Component, where $$\text{Spread Component} = \text{Max}\left(\frac{Spread^{c_1}}{2}, 0.35*Spread\right), \text{ and}$$

Liquidity Demand Component =

$$C_2 * \left(\frac{\text{Order Size} - \text{Depth}}{\text{Volume30 min}}\right)^{c_3} * \text{Volatility30 min} C_4.$$

If the Order Size is less than the Depth, there is no PI forecasting.

Real-time information required for forecast includes:

Spread—Most recent Bid-Ask spread in cents,

Order size—Order size in round lots with tolerable Fractional number (Trim the original order size to 50,000 shares if it's more than 50,000 for robustness.)

Depth—Ask Size—For Buy Orders (Round lot), Bid Size—For Sell Orders (Round lot)—, Volume30 min—

MAX (Total share volume in the past 30 minutes, LowerThreshold);

If after 10:00am: LowerThreshold=ADV*(Pct1*T1+Pct2 *T2)/3);

If before 10:00am: LowerThreshold=ADV*(Pct2*T2)/3);

where
- T2 = 1/30*Minutes in the current 30-min bin and
- T1 = 1−T2
- Pct1 and Pct2, average volume profiles of previous and current 30-minute bins.

Volatility30 min—Difference in dollar between highest and lowest of ASK prices for BUY orders and BID price for SELL orders in the past 30 minutes, with bounds (0.02, BID/20) (Note that 0.02 is used for market with available quote).

In addition to the real-time feed, the model requires the parameter estimates of $C_1, \ldots, C_4$ are calculated based on the combination of market ("UN" and "UQ") and two market cap levels (Lower and Upper Capital threshold). Altogether there are four models, all with the same function specification, that are fitted for each of the four sub-samples. For the model, stocks that traded primarily on the "US" market uses the same parametes which are associated with the "UN" market and stocks that traded primarily on the "UR" market uses the same parameters as that of stocks primarily traded on the "UQ" market.

Volume30 min can be obtained as snapshot of intra-day market consideration and is inaccessible for the early trading before 10:00am. To solve this problem, the scaling rules set up as below are adopted:

For orders before 9:45 pm: Volume 30 min=Volume from open+(T1/30)*Empirical Volume30 min before 10:00 am For orders after 9:45 pm: Volume30 min=Volume from open*(30/T2) before 10:00 pm, where, T2 is the time window from open to order submission and T1 is the window left from T2. Volume30 min of early trading is also subject to Lower Threshold=ADV*(Pct*T2/30)/3).

Since the models are fitted separately, a significant degree of discontinuity is present when a stock crosses the market cap boundary. To solve this issue, sudden changes can be smoothed out at this boundary. Specifically, the boundary value refers respectively to (lowercapthreshold) for large cap stocks and (upperercapthreshold) for small cap ones in the deliverable.

The Large Cap Model is to get prediction $$(PI_\tau^{LargeCapModel})$$

if market cap is 20% more of the boundary value. The Small Cap Model is used to get prediction $$(PI_\tau^{SmallCapModel})$$

if market cap is 20% less of the boundary value. Otherwise, the predictions from large and small cap models can be mixed as $$PI\tau = \frac{(1.2 * \text{Boundry} - MKTCAP) * (PI_\tau^{SmallCapModel}) + (MKTCAP - 0.8 * \text{Boundary}) * (PI_\tau^{LargeCapModel})}{0.4 * \text{Boundary}}$$

Market cap levels mentioned above are defined through lowercapthreshold and upperercapthreshold.

ACE

Numerous stock data is required to ACE calculations (see, the '719 application referenced above), including:
- primary exchange,
- price impact estimates based on 1 year of tick data,
- price improvement estimates based on execution data,
- intra-day volume,
- volatility and spread distributions,
- daily (forward-looking) relative volatility, and
- 21-days median dollar volume (addv), and average relative spread.

ACE cost estimates are derived using a one-bin strategy, i.e. the whole order size for a stock is executed in the bin the time τ belongs to. All ACE calculations use the latest available ACE files and executables and are applied to the listed case (i.e., ACE costs should be computed once for the whole list of stocks rather than for each stock individually).

Cutoffs are group-specific, where the groups are classified by market, (forward-looking) volatility and addv.

Tracking Statistics

Tracking Statistics is defined as $$\frac{(1 + r_\tau)}{(1 + Index_\tau)} - 1,$$

where $r_\tau$ is the return of stock I over time intervals $\tau - \Delta\tau$ and τ, and Index, is the return of benchmark such as market, sector, industry, and ETF (Exchange Traded Fund) over the same interval. Two types of tracking statistics are contemplated: a first is for the five-minute interval ($\Delta\tau=300$ seconds) and a second is for cumulative excess return since yesterday's close ($\Delta\tau$ is not fixed, but depends on the time of the last trade during the previous trading day). Since the real-time returns for market, sector, and industry are not always available, relevant ETFs can be identified in order to approximate returns of interest. An exemplary list of ETF's that can be used is presented in the table below:

TABLE I

| | preferred pick | | alternative pick | |
|---|---|---|---|---|
| Sector | ticker | vendor/advisor | ticker | vendor/advisor |
| Materials | IYM | DJ | VAW | Vanguard |
| Consumer discretionary | IYC | DJ | VCR | Vanguard |
| Consumer staples | XLP | SPDR | IYK | DJ |
| Financials | XLF | SPDR | IYF | DJ |
| Healthcare | IYH | DJ | — | — |
| Industrials | XLI | SPDR | IYJ | DJ |
| Information technology | XLK | SPDR | IYW | DJ |
| Resources | IGE | GSachs | — | — |
| Telecom | IYZ | DJ | — | — |
| Utilities | XLU | SPDR | IDU | DJ |

The excess return could be brought together with an indicator whether the stock moves the same direction of the index. Mapping from quantitative statistics into qualitative signals may be based on separate distributions when the stock moves the same direction as the index and different direction. Further, the cutoffs are group-specific where the groups are classified by market cap and sector.

Market capitalization groups are "small" (bottom 30% of NYSE market capitalization), "medium" (middle 40% of NYSE market capitalization) and "big" (top 30% of NYSE market capitalization). NYSE market capitalization is recorded as of the first trading day of the current quarter. Current cutoff values (30% and 70-% NYSE size percentiles in millions) will be presented as the "lower cap threshold" and "upper cap threshold" of "medium" size stocks.

From the above, it will be appreciated that the present invention provides a system and a method for generating one or more quantitative and qualitative indicators that aim to point out abnormalities in a trade list. In one sense, the present invention is a "tail management" tool that attempts to predict or warn the traders on abnormal changes/movements that happen in real-time to certain stocks in the trade list. Analytics are based on relations between historical and real-time data. In particular, the analytics are calculated as a ratio or a relative measurement of a real-time variable (such as volume traded, volatility, relative return tracking, etc.) related to a first security traded on an exchange to an estimate of the real-time variable based on historical data. Both the real-time value of the variable as well as the estimate of it based on historical data can be dynamically updated throughout the day. An empirical distribution for the analytic can be generated based on a peer group for the first security. The peer group preferably includes a plurality of securities having similar characteristics to the first security (e.g., sector, exchange, market capitalization, average daily trading volume, volatility, price, etc.). The method includes a step of comparing the calculated ratio or relation to the generated empirical distribution, and then determining whether or not an abnormal condition exists based on the comparison. An indicator can be displayed to a trader as an indication of the abnormal condition.

Thus, a number of preferred embodiments have been fully described above with reference to the drawing figures. Although the invention has been described based upon these preferred embodiments, it would be apparent to those of skill in the art that certain modifications, variations, and alternative constructions could be made to the described embodiments within the spirit and scope of the invention. For example, as explained above, numerous other analytics could be calculated for the purpose of generating indicators of abnormal trading conditions for a security according to the present invention.

What is claimed is:

1. A computer implemented method of detecting an abnormal condition of a security traded on an exchange, said method comprising the steps of:
    receiving on a computer in real-time data from a remote data source via a digital communications link including a value of a first variable related to a condition of a first security;
    estimating with a computer the value of the first variable based on historical market data for the first security;
    calculating with a computer a first analytic metric based on a relationship between the value obtained by real-time monitoring and the value obtained by estimating;
    retrieving with a computer a plurality of values of the first variable related to the condition of each of a plurality of securities in a peer group of the first security;
    estimating with a computer a plurality of values of the first variable based on historical market data for each of the plurality of securities in the peer group;
    calculating with a computer an empirical distribution of analytic metrics for the peer group, wherein the analytic metrics are based on relationships between the values of the first variable retrieved for members of the peer group and the values obtained by estimating;
    comparing with a computer the first analytic metric for the first security with the empirical distribution of analytic metrics for the peer group to determine whether the condition of the first security is abnormal; and
    displaying on a computer display an indicator reflective of abnormality in the condition of the first security.

2. The method of claim 1, wherein said step of receiving a real-time value of a first variable includes the step of periodically selecting a real-time value of a first variable from a stream of real-time values throughout a trading day; wherein the historical market data is stored in a database, and further comprising the step of periodically updating the database using the stream of real-time values.

3. The method of claim 1, wherein said estimating step includes calculating a moving average of the value over a predetermined period of time using historical market data.

4. The method of claim 1, wherein said calculating step includes calculating at least one of relative volatility, relative volume, and relative cost.

5. The method of claim 1, wherein said calculating step includes calculating relative cost.

6. The method of claim 1, wherein empirical distributions of analytic metrics are stored in a peer group database and wherein said retrieving step includes retrieving the empirical distribution corresponding to a peer group of the first security from the peer group database;
    wherein values of the first variable for a plurality peer groups are stored in a peer group database and wherein said retrieving step includes generating the empirical distribution of analytic metrics using values from the peer group database.

7. The method of claim 6, wherein said plurality of empirical distributions are based on a plurality of different peer groups.

8. The method of claim 1, wherein said retrieving step is performed periodically throughout a trading day at predetermined intervals, and each time a real-time value of the first variable is selected.

9. The method of claim 1, wherein said retrieving step includes defining a peer group and gathering data related to the peer group to generate the empirical distribution; wherein the peer group is either defined statically based on at least one of industry sector, exchange and market capitalization or dynamically based on real-time data related to the peer group;
    wherein the peer group is defined dynamically based on real-time data related to the peer group.

10. The method of claim 1, wherein said comparing step includes determining where the calculated analytic metric falls within the empirical distribution; wherein said determining step includes describing where the calculated analytic metric falls within the empirical distribution in terms of percentile or in terms of standard deviation.

11. The method of claim 10, wherein said determining step includes describing where the calculated analytic metric falls within the empirical distribution in terms of standard deviation.

12. The method of claim 1, wherein the indicator in said displaying step is reflective of the degree of abnormality of the security condition based on said comparing step and includes at least one of a numerical value related to the degree of abnormality, a number of symbols, wherein the number of symbols is related to the degree of abnormality, and a color coded numerical value related to the degree of abnormality;
    wherein symbols include at least one of up and down arrows and bars, the up arrows representing a condition in the upper half of the empirical distribution and the down arrows representing a condition in the lower half of the empirical distribution, the bars being on either side of a divider to represent a condition in the upper or lower half of the distribution.

13. The method of claim 1, further comprising the step of executing a trade based on said comparing step.

14. A system for generating an indicator of abnormality in the condition of a security traded on an exchange using real-time data from a remote source, said system comprising:
    a computer including a processor and a memory device storing a set of machine readable instructions executable by said processor;
    means for receiving data in real-time from the remote source via a digital communications link electronic including a real-time value of a first variable related to a condition of a first security;

and estimate means for retrieving historical market data for the first security and estimating the value of the first variable based on the historical market data for the first security;

means for calculating a first analytic metric for the first security based on a relationship between the value received in real-time and the value obtained by estimating;

means for retrieving a plurality of values of the first variable related to the condition of each of a plurality of securities in a peer group of the first security;

means for estimating a plurality of values of the first variable based on historical market data for each of the plurality of securities in the peer group;

means for calculating an empirical distribution of analytic metrics for the peer group, wherein the analytic metrics are based on relationships between the values of the first variable retrieved for members of the peer group and the values obtained by estimating;

means for comparing the first analytic metric for the first security with the empirical distribution of analytic metrics for the peer group to determine abnormality in the condition of the first security; and means for displaying an indicator reflective of abnormality in the condition of the first security.

15. The system of claim 14, wherein said system receive means is configured to receive a stream of real-time values of the first variable and periodically selects a real-time value of the first variable from the stream of real-time values throughout a trading day.

16. The system of claim 14, wherein said first variable is return and wherein said analytic metric is relative volatility, or wherein said first variable is trading volume and wherein said analytic metric is relative volume.

17. The system of claim 14, wherein said receive means is configured to receive in real-time from a remote source real-time values of a plurality of variables related to a condition of the security;

wherein said variables include bid-ask spread, depth, volume, and volatility, and wherein said analytic metric is relative cost, or said variables include return of the security over a first predetermined time period and return of a benchmark index over the first predetermined time, and wherein said analytic metric includes tracking statistics.

18. The system of claim 17, wherein said retrieve means is configured to retrieve a plurality of empirical distributions for a respective plurality of variables;

wherein said plurality of empirical distributions are based on one or more peer groups;

wherein said system includes a database containing values of the first variable for the peer group, and the system is configured to retrieve values of the first variable for the peer group from said databases and generate the empirical distribution using the peer group values from said database.

19. The system of claim 18, wherein said plurality of empirical distributions are based on a plurality of different peer groups.

20. The system of claim 14, wherein said retrieve means is configured to define a peer group and gather data related to the peer group to generate the empirical distribution;

wherein the peer group is defined either statically or dynamically based on real-time data related to the peer group.

21. The system of claim 14, wherein said compare means is configured to determine where the calculated analytic metric falls within the empirical distribution in terms of standard deviation or in terms of percentile.

22. The system of claim 14, further including a monitor and a set of machine readable instructions executable by a computer to display an indicator reflective of the degree of abnormality of the security condition on said monitor;

wherein said indicator includes one of symbols and a numerical value related to the degree of abnormality;

wherein said symbols can be one of up arrow and down arrows.

23. The system of claim 22, wherein said set of machine readable instructions further includes instructions executable by said processor to execute a trade.

24. The system of claim 14, wherein the means for calculating a first analytic metric, estimating a plurality of values of the first variable for each of the securities in the peer group, calculating an empirical distribution of analytic metrics, and comparing the first analytics metric with the empirical distribution of analytic metrics comprise the processor and memory device storing a set of machine readable instructions.

25. A computer program product for generating an indicator of abnormality in the condition of a security traded on an exchange, said computer program product comprising a digital storage media and a set of machine readable instructions stored on said digital storage media, wherein said instructions are executable by a computer to:

establish communication between the computer and a remote source;

receive electronic data via a digital communications link including a value of a first variable related to a condition of a first security in real-time from the remote source;

retrieve historical market data for the first security and estimate the value of the first variable based on the historical market data for the first security;

calculate a first analytic metric based on a relationship between the value received in real-time and the value obtained by estimating;

retrieve a plurality of values of the first variable related to the condition of each of a plurality of securities in a peer group of the first security;

estimate a plurality of values of the first variable based on historical market data for each of the plurality of securities in the peer group;

calculate an empirical distribution of analytic metrics for the peer group, wherein the analytic metrics are based on relationships between the values of the first variable retrieved for members of the peer group and the values obtained by estimating;

compare the first analytic metric for the first security with the empirical distribution of analytic quantities for the peer group to determine whether a condition of the first security is abnormal; and display an indication reflective of abnormality in the condition of the first security.

26. The computer program product of claim 25, wherein said computer program product further includes instructions executable by the computer to estimate a value of the first variable by calculating a moving average of the value over a predetermined period of time using historical market data;

wherein said analytic metric includes a ratio of the real-time value of the first variable to the estimated value of the first variable; and wherein said first variable is return and wherein said analytic metric is relative volatility, or wherein said first variable is trading volume and wherein said analytic metric is relative volume.

* * * * *